(12) United States Patent
Minato et al.

(10) Patent No.: US 11,933,771 B2
(45) Date of Patent: Mar. 19, 2024

(54) ANALYSIS CONTROL DEVICE, LIQUID CHROMATOGRAPHIC SYSTEM AND ANALYSIS EXECUTION METHOD

(71) Applicant: SHIMADZU CORPORATION, Kyoto (JP)

(72) Inventors: Hiroyuki Minato, Kyoto (JP); Masahide Gunji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 417 days.

(21) Appl. No.: 17/413,808

(22) PCT Filed: Dec. 20, 2018

(86) PCT No.: PCT/JP2018/047088
§ 371 (c)(1),
(2) Date: Jun. 14, 2021

(87) PCT Pub. No.: WO2020/129223
PCT Pub. Date: Jun. 25, 2020

(65) Prior Publication Data
US 2022/0018818 A1    Jan. 20, 2022

(51) Int. Cl.
*G01N 30/74* (2006.01)
*G01N 21/76* (2006.01)
(Continued)

(52) U.S. Cl.
CPC ......... *G01N 30/74* (2013.01); *G01N 30/8631* (2013.01); *G01N 21/76* (2013.01);
(Continued)

(58) Field of Classification Search
CPC ............... G01N 30/74; G01N 30/8631; G01N 2030/027; G01N 30/06; G01N 30/86; G01N 21/76; G01N 30/84
See application file for complete search history.

(56) References Cited

U.S. PATENT DOCUMENTS

2015/0019141 A1* 1/2015 Ohashi ................... B01D 15/08
702/25

FOREIGN PATENT DOCUMENTS

JP         04-001305 B2     1/1992
JP        2000-081442 A     3/2000
(Continued)

OTHER PUBLICATIONS

Office Action for corresponding JP Patent Application No. 2020-560735 dated Dec. 7, 2021, with English language machine translation.
(Continued)

*Primary Examiner* — Peter J Macchiarolo
*Assistant Examiner* — John M Royston
(74) *Attorney, Agent, or Firm* — Renner, Otto, Boisselle & Sklar, LLP

(57) ABSTRACT

A first liquid sending controller of an analysis control device controls a first liquid sender such that a mobile phase is supplied to a fluorescence detector through an analysis column and a junction during an analysis of a sample. A sample introduction controller controls a sample introducer such that the sample is introduced into a mobile phase by the sample introducer at a position farther upstream than the analysis column during the analysis of the sample. The second liquid sending controller causes a second liquid sender to start supplying a fluorescent reaction liquid such that the fluorescent reaction liquid arrives at the junction later than a point in time at which supply of the mobile phase starts and before the sample introduced into the mobile phase arrives at the junction during the analysis of the sample. A generator generates a chromatogram based on an output signal of the fluorescence detector during the analysis of the sample.

5 Claims, 5 Drawing Sheets

(51) Int. Cl.
  *G01N 30/02*   (2006.01)
  *G01N 30/06*   (2006.01)
  *G01N 30/84*   (2006.01)
  *G01N 30/86*   (2006.01)

(52) U.S. Cl.
  CPC ....... *G01N 2030/027* (2013.01); *G01N 30/06* (2013.01); *G01N 30/84* (2013.01); *G01N 30/86* (2013.01)

(56) References Cited

FOREIGN PATENT DOCUMENTS

| | | | | |
|---|---|---|---|---|
| JP | 2000081442 | A | * | 3/2000 |
| JP | 2000-193649 | A | | 7/2000 |
| JP | 2000193649 | A | * | 7/2000 |

OTHER PUBLICATIONS

International Search Report with respect to International Patent Application No. PCT/JP2018/047088, dated Mar. 19, 2019.
Written Opinion of the International Searching Authority with respect to International Patent Application No. PCT/JP2018/047088 (English Machine Translation).
Office Action in corresponding Chinese Patent Application No. 201880100263.6 dated Sep. 4, 2023, with English machine translation.

* cited by examiner

ANALYSIS CONTROL DEVICE, LIQUID CHROMATOGRAPHIC SYSTEM AND ANALYSIS EXECUTION METHOD

TECHNICAL FIELD

The present invention relates to an analysis control device, a liquid chromatographic system and an analysis execution method.

BACKGROUND ART

A liquid chromatographic system using a fluorescence detector has been known (see Patent Document 1, for example). In the liquid chromatographic system, a mobile phase to which a sample is introduced is supplied to an analysis column, for example. A fluorescent reaction liquid joins the mobile phase and the sample that have passed through the analysis column, and a specific component in the sample reacts with the fluorescent reaction liquid and is changed to a fluorescent derivative when passing through a reaction coil. Fluorescence emitted by the derivative is detected by the fluorescence detector.

[Patent Document 1] JP 2000-193649 A

SUMMARY OF INVENTION

Technical Problem

In the liquid chromatographic system using the fluorescence detector, a fluorescent reaction liquid having a high pH may be used. In this case, an optical component such as a flow cell of the fluorescence detector is dissolved by the fluorescent reaction liquid, and the liquid may leak in the fluorescence detector. Therefore, frequency of maintenance or replacement of optical components is high.

An object of the present invention is to provide an analysis control device, a liquid chromatographic system and an analysis execution method that enable reduction of frequency of maintenance or replacement of components of a fluorescence detector.

Solution to Problem

An analysis control device according to one aspect of the present invention that controls a liquid chromatograph including a first liquid sender, a second liquid sender, a sample introducer, an analysis column, a junction and a fluorescence detector includes a first liquid sending controller that controls the first liquid sender such that a mobile phase is supplied to the fluorescence detector through the analysis column and the junction during an analysis of a sample, a second liquid sending controller that controls the second liquid sender such that a fluorescent reaction liquid is supplied to the fluorescence detector through the junction during the analysis of the sample, a sample introduction controller that controls the sample introducer such that the sample is introduced into the mobile phase by the sample introducer at a position farther upstream than the analysis column during the analysis of the sample, and a generator that generates a chromatogram based on an output signal of the fluorescence detector during the analysis of the sample, wherein the second liquid sending controller causes the second liquid sender to start supplying the fluorescent reaction liquid such that the fluorescent reaction liquid arrives at the junction later than a point in time at which supply of the mobile phase starts and before the sample introduced into the mobile phase arrives at the junction, and causes the second liquid sender to stop supplying the fluorescent reaction liquid after the sample passes through the junction.

In the analysis control device, the mobile phase is supplied by the first liquid sender to the fluorescence detector through the analysis column and the junction during the analysis. On the other hand, the supply of the fluorescent reaction liquid to the junction is started later than a point in time at which supply of the mobile phase starts and before the sample introduced into the mobile phase arrives at the junction, and the supply of the fluorescent reaction liquid to the junction is stopped after the sample has passed through the junction. When the sample arrives at the junction, because the fluorescent reaction liquid is supplied to the junction, a specific component in the sample is changed to a fluorescent derivative by the fluorescent reaction liquid while the sample moves from the junction to the fluorescence detector. Thus, a peak corresponding to the specific component in the sample appears in the chromatogram. In this case, the period of time in which the fluorescent reaction period is supplied to the fluorescence detector is shorter than the total period of time of the analysis. As a result, frequency of maintenance or replacement of components of the fluorescence detector can be reduced.

The analysis control device may further include a supply period determiner that determines a period from a point in time at which the second liquid sender starts supplying the fluorescent reaction liquid to a point in time at which the second liquid sender ends supplying the fluorescent reaction liquid as a supply period during determination of an analysis condition, wherein the second liquid sending controller may cause the second liquid sender to start supplying the fluorescent reaction liquid at a start point in time of the determined supply period and may cause the second liquid sender to stop supplying the fluorescent reaction liquid at an end point in time of the supply period during the analysis of the sample.

With the above-mentioned configuration, during the analysis of a sample, the start and stop of supply of the fluorescent reaction liquid by the second liquid sender is controlled based on the supply period determined during determination of an analysis condition. In this case, the determined supply period can be used in an analysis that is to be performed any number of times.

The first and second liquid sending controllers may control the first liquid sender such that the mobile phase is supplied to the fluorescence detector through the analysis column and the junction, and may control the first and second liquid senders such that the fluorescence reaction liquid is supplied to the fluorescence detector through the junction, during the determination of the analysis condition, the sample introduction controller may control the sample introducer such that the sample is introduced into the mobile phase by the sample introducer at a position farther upstream than the analysis column during the determination of the analysis condition, and the supply period determiner may include a peak period detector that detects a period in which a peak of a component in the sample appears with respect to a point in time at which the sample is introduced into the mobile phase as a peak appearance period based on a chromatogram generated by the generator during the determination of the analysis condition, a time calculator that calculates a moving time in which the sample moves from the junction to the fluorescence detector based on a total flow rate of the mobile phase, the sample and the fluorescent reaction liquid that are supplied from the junction to the fluorescence detector and a volume of a flow path from the junction to the fluorescence detector during the determination of the analysis condition, and a period calculator that calculates a period including a period that starts earlier than the peak appearance period detected by the peak period detector by the moving time calculated by the time calculator as the supply period during determination of the analysis condition. In this case, during determination of an analysis condition, the supply period in which the fluorescent reaction liquid is supplied is determined automatically.

A liquid chromatographic system according to another aspect of the present invention includes a liquid chromatograph that includes a first liquid sender, a second liquid sender, a sample introducer, an analysis column, a junction and a fluorescence detector, and the above-mentioned analysis control device that controls the liquid chromatograph.

An analysis execution method according to yet another aspect of the present invention performed by a liquid chromatograph that includes an analysis column, a junction and a fluorescence detector includes the steps of supplying a mobile phase to the fluorescence detector through the analysis column and the junction during an analysis of a sample, supplying a fluorescent reaction liquid to the fluorescence detector through the junction during the analysis of the sample, introducing the sample into the mobile phase at a position farther upstream than the analysis column during the analysis of the sample, and generating a chromatogram based on an output signal of the fluorescence detector during the analysis of the sample, wherein the step of supplying the fluorescent reaction liquid to the fluorescence detector through the junction includes starting supply of the fluorescent reaction liquid such that the fluorescent reaction liquid arrives at the junction later than a point in time at which supply of the mobile phase starts and before the sample introduced into the mobile phase arrives at the junction, and stopping the supply of the fluorescent reaction liquid after the sample passes through the junction.

The analysis execution method may further include the step of determining a period from a point in time at which supply of the fluorescent reaction liquid starts to a point in time at which the supply of the fluorescent reaction liquid ends as a supply period during determination of an analysis condition, wherein a step of supplying the fluorescent reaction liquid to the fluorescence detector may include starting supply of the fluorescent reaction liquid at a start point in time of the determined supply period and stopping the supply of the fluorescent reaction liquid at an end point in time of the supply period during the analysis of the sample.

The step of determining the supply period may include detecting a period in which a peak of a component in the sample appears with respect to a point in time at which the sample is introduced into the mobile phase based on the generated chromatogram as a peak appearance period during the determination of the analysis condition, calculating a moving time in which the sample moves from the junction to the fluorescence detector based on a total flow rate of the mobile phase, the sample and the fluorescent reaction liquid that are supplied from the junction to the fluorescence detector and a volume of a flow path from the junction to the fluorescence detector during the determination of the analysis condition, and calculating a period including a period that includes a period starting earlier than the detected peak appearance period by the calculated moving time as the supply period during the determination of the analysis condition.

Advantageous Effects of Invention

The present invention can reduce frequency of maintenance or replacement of components of a fluorescence detector.

DESCRIPTION OF EMBODIMENTS

An analysis control device, a liquid chromatographic system and an analysis execution method according to embodiments of the present invention will be described below in detail with reference to the drawings.

(1) Configuration of Liquid Chromatographic System

Figure 1:
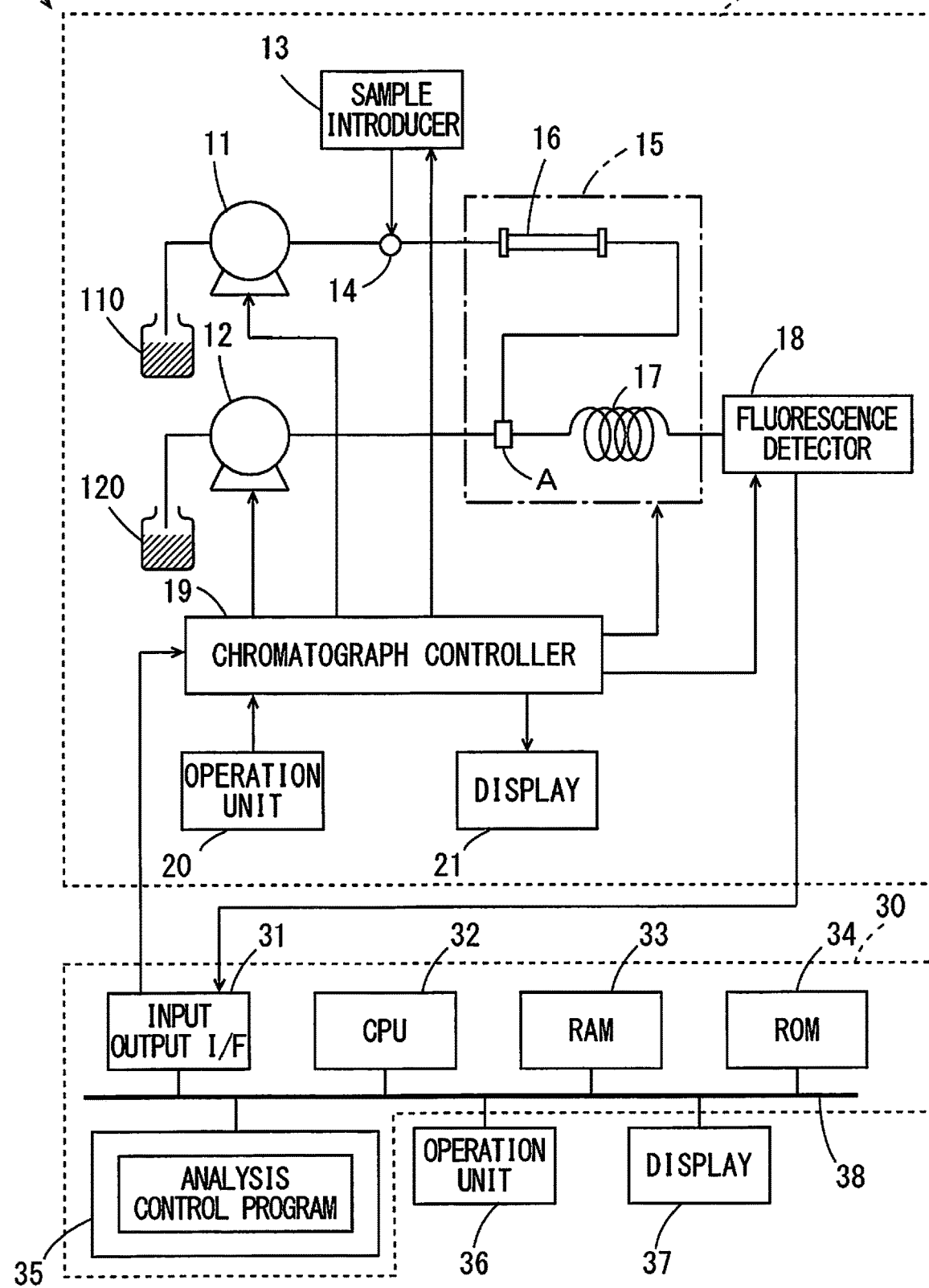
FIG. 1 is a block diagram showing the configuration of a liquid chromatographic system including an analysis control device according to one embodiment of the present invention.

FIG. 1 is a block diagram showing the configuration of the liquid chromatographic system including the analysis control device according to one embodiment. The liquid chromatographic system according to the present embodiment is a system for HPLC (High Performance Liquid Chromatography) that includes a fluorescence detector.

The liquid chromatographic system 100 of FIG. 1 includes a liquid chromatograph 10 and the analysis control device 30. The liquid chromatograph 10 includes a first pump 11 for a mobile phase, a second pump 12 for a fluorescent reaction liquid, a sample introducer 13, an introduction port 14, a column oven 15, an analysis column 16, a reaction coil 17 and the fluorescence detector 18. The analysis column 16 and the reaction coil 17 are provided in the column oven 15. The column oven 15 keeps the analysis column 16 and the reaction coil 17 at set temperatures.

The first pump 11 sucks a mobile phase in a mobile phase container 110 and supplies the mobile phase to the analysis column 16. The sample introducer 13 includes an autosampler or an injector, for example, and introduces a sample to be analyzed to the mobile phase in the introduction port 14. The second pump 12 sucks a fluorescent reaction liquid in a fluorescent reaction liquid container 120 and supplies the fluorescent reaction liquid to a junction A. In the present embodiment, the second pump 12 is controlled to be turned ON and OFF as described below.

The mobile phase and the sample that have passed through the analysis column 16 join the fluorescent reaction liquid in the junction A. Thus, a specific component in the sample reacts with the fluorescent reaction liquid and is changed to a fluorescent derivative. The mobile phase, the sample and the fluorescent reaction liquid that are joined in the junction A are supplied to the fluorescence detector 18 through the reaction coil 17. The fluorescence detector 18 detects fluorescence emitted by the specific component.

Further, the liquid chromatograph 10 includes a chromatograph controller 19, an operation unit 20 and a display 21. The chromatograph controller 19 controls the first pump 11, the second pump 12, the sample introducer 13, the column oven 15 and the fluorescence detector 18. The operation unit 20 is used by a user to provide various instructions to the chromatograph controller 19. The display 21 displays various data and so on.

The analysis control device 30 includes an input output I/F (interface) 31, a CPU (Central Processing Unit) 32, a RAM (Random Access Memory), a ROM (Read Only Memory) 34 and a storage device 35 and is constituted by a personal computer or a server, for example. The input output I/F 31, the CPU 32, the RAM 33, the ROM 34 and the storage device 35 are connected to a bus 38. An operation unit 36 and a display 37 are connected to the bus 38 of the analysis control device 30. The operation unit 36 includes a keyboard, a pointing device and so on, and is used to input various values, etc. and perform various operations. The display 37 includes a liquid crystal display, an organic electroluminance display or the like and displays various information and images. The operation unit 36 and the display 37 may be constituted by a touch panel display.

The storage device 35 includes a storage medium such as a hard disc, an optical disc, a magnetic disc, a semiconductor memory or a memory card and stores an analysis control program. The RAM 33 is used as a work area for the CPU 32. A system program is stored in the ROM 34. The CPU 32 executes the analysis control program stored in the storage device 35 on the RAM 33, so that an analysis execution method, described below, is performed. The analysis execution method includes a method of determining an analysis condition and a method of analyzing a sample.

(2) Functional Configuration of Analysis Control Device 30

Figure 2:
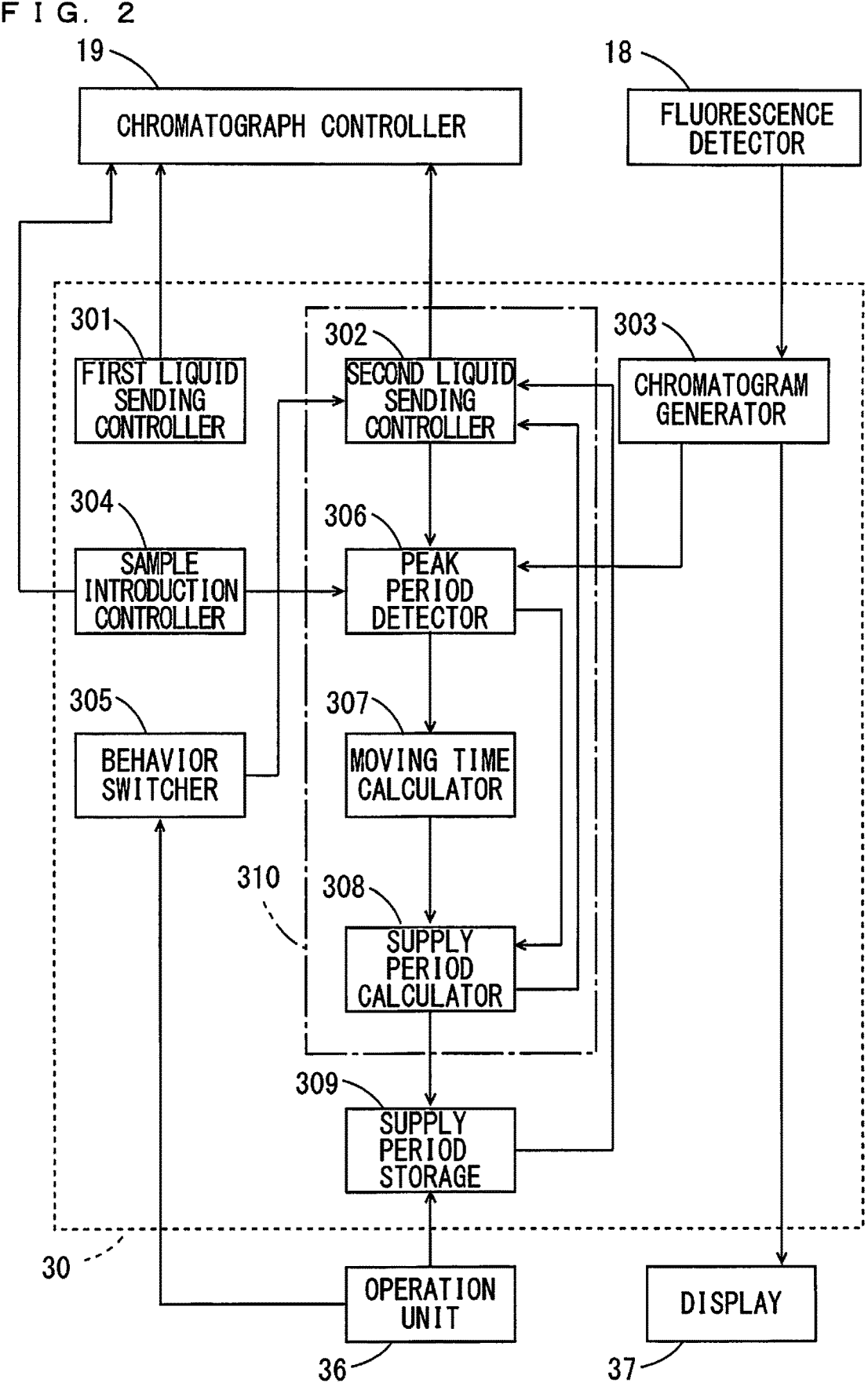
FIG. 2 is a block diagram showing the functional configuration of the analysis control device of FIG. 1.

FIG. 2 is a block diagram showing the functional configuration of the analysis control device 30 of FIG. 1. As shown in FIG. 2, the analysis control device 30 includes a first liquid sending controller 301, a second liquid sending controller 302, a chromatogram generator 303, a sample introduction controller 304, a behavior switcher 305, a peak period detector 306, a moving time calculator 307, a supply period calculator 308 and a supply period storage 309. The second liquid sending controller 302, the peak period detector 306, the moving time calculator 307 and the supply period calculator 308 constitute a supply period determiner 310. The functions of the above-mentioned constituent elements (301 to 310) are implemented by execution of the analysis control program which is a computer program stored in a storage medium (recording medium) such as the storage device 35 by the CPU 32 of FIG. 1. Part or all of the constituent elements of the analysis control device 30 may be implemented by hardware such as an electronic circuit.

The first liquid sending controller 301 instructs the chromatograph controller 19 to turn ON and OFF the first pump 11. The second liquid sending controller 302 instructs the chromatograph controller 19 to turn ON and OFF the second pump 12. The sample introduction controller 304 instructs the chromatograph controller 19 to introduce a sample using the sample introducer 13.

The behavior switcher 305 switches the behavior of the liquid chromatograph 10 between the behavior during determination of an analysis condition and the behavior during an analysis of a sample based on an operation performed by the user using the operation unit 36. Specifically, the behavior switcher 305 switches the behavior of the second liquid sending controller 302 between the behavior during determination of an analysis condition and the behavior during an analysis of a sample.

During determination of an analysis condition, the first pump 11 and the second pump 12 are turned ON from a point in time at which an analysis starts to a point in time at which the analysis ends. On the other hand, during an analysis of a sample, the first pump 11 is turned ON from a point in time at which the analysis starts to a point in time at which the analysis ends, and the second pump 12 is turned ON only in a determined supply period.

The chromatogram generator 303 generates a chromatogram based on an output signal from the fluorescence detector 18 during determination of an analysis condition and during an analysis of a sample. A generated chromatogram is displayed in the display 37.

The peak period detector 306 detects a period in which a peak corresponding to a specific component in a sample appears with respect to a point in time at which the sample is introduced into a mobile phase as a peak appearance period based on a chromatogram generated by the chromatogram generator 303 during determination of an analysis condition.

The moving time calculator 307 calculates a moving time in which a sample moves from the junction A to the fluorescence detector 18 based on a total flow rate of a mobile phase, a sample and a fluorescent reaction liquid supplied from the junction A to the fluorescence detector 18 and a volume of a flow path from the junction A to the fluorescence detector 18 during determination of an analysis condition. The flow rates of the mobile phase and the sample are flow rates set in the first pump 11. The flow rate of the fluorescent reaction liquid is a flow rate set in the second pump 12. The volume of the flow path from the junction A to the fluorescence detector 18 is the volume of a pipe extending from the junction A to the fluorescence detector 18 and including the reaction coil 17.

The supply period calculator 308 calculates a period that includes a peak appearance period detected by the peak period detector 306 and a moving time starting earlier than the peak appearance period by the moving time as a supply period during determination of an analysis condition. Thus, a supply period in which a fluorescent reaction liquid is supplied is determined. A specific example of a method of determining the supply period will be described below. The supply period storage 309 stores the supply period calculated by the supply period calculator 308. The determined supply period is defined in an analysis method as one analysis condition.

In a case where the user determines a supply period, the user inputs the determined supply period to the supply period storage 309 using the operation unit 36. In a case where the user determines a supply period, the peak period detector 306, the moving time calculator 307 and the supply period calculator 308 do not have to be provided.

(3) Specific Example of Method of Determining Supply Period

Figure 3:
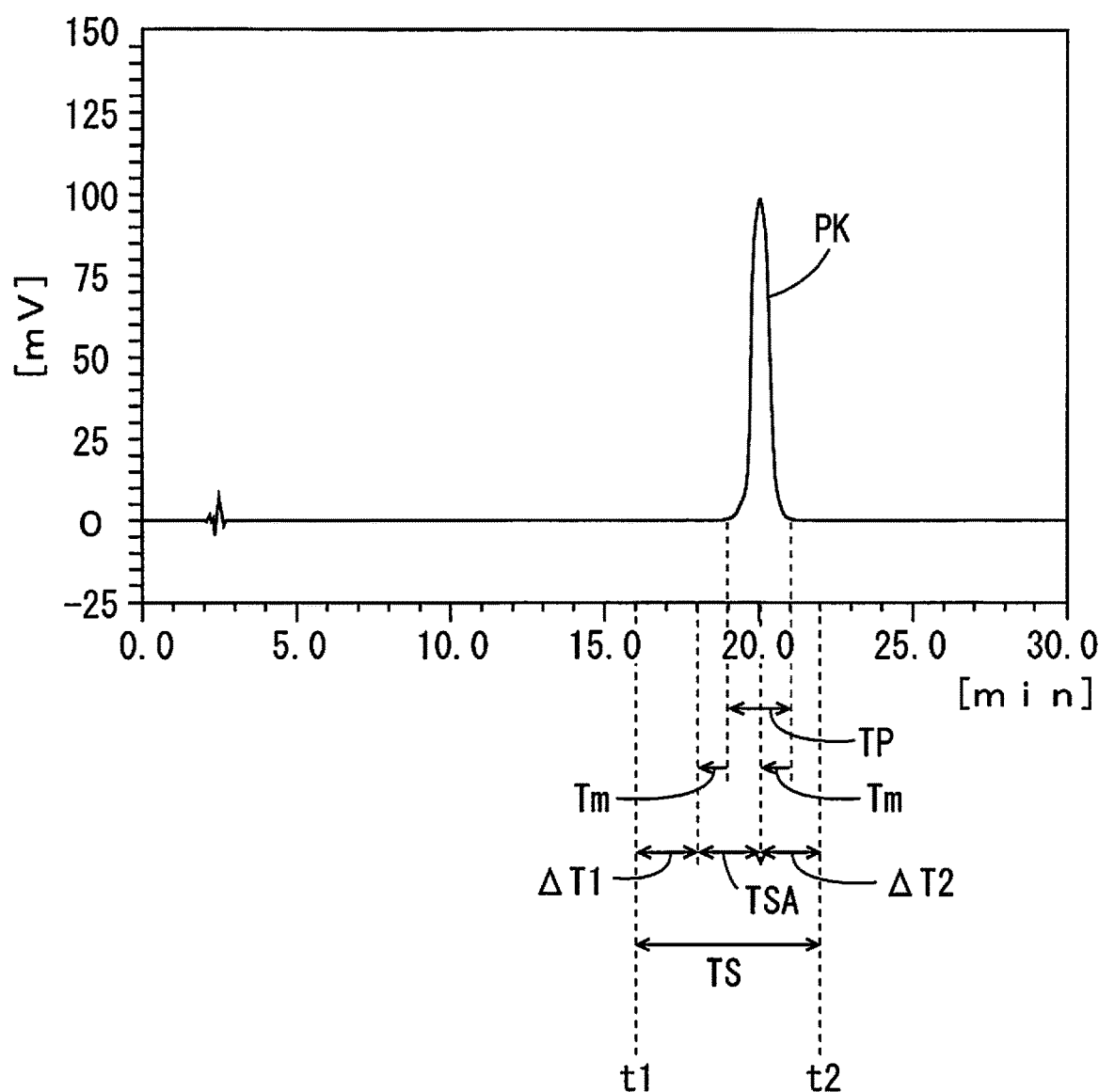
FIG. 3 is a diagram showing one example of a chromatogram obtained by the liquid chromatographic system of FIG. 1.

FIG. 3 is a diagram showing one example of a chromatogram obtained by the liquid chromatographic system 100 of FIG. 1. A method of determining a supply period in which a fluorescent reaction liquid is supplied by the second pump 12 will be described with reference to FIG. 3. The abscissa of FIG. 3 indicates the time (minutes), and the ordinate indicates a voltage (mV) of an output signal of the fluorescence detector 18.

During determination of an analysis condition, an analysis is performed at least once with the use of a standard sample, for example. During an analysis, the first pump 11 and the second pump 12 are turned ON. Thus, a chromatogram of FIG. 3 is obtained. The total time for an analysis is 30.0 minutes.

In the chromatogram of FIG. 3, 0.0 min is a point in time at which a sample is introduced into the introduction port 14 by the sample introducer 13. A peak PK appears about 20.0 minutes later than the point in time at which the sample is introduced. A point in time at which an appearance period TP of the peak PK starts is 19.0 min, and a point in time at which the appearance period TP ends is 21.0 min. In the present example, the volume of the flow path from the junction A to the fluorescence detector 18 in the liquid chromatograph 10 is 2000 [μL]. Further, a discharge flow rate of the first pump 11 is 1000 [μL/min], and a discharge flow rate of the second pump 12 is 1000 [μL/min]. In this case, the total flow rate of a mobile phase, the sample and a fluorescent reaction liquid that are supplied from the junction A to the fluorescence detector 18 through the reaction coil 17 is 2000 [μL/min]. Therefore, a moving time Tm required for the sample to move from the junction A to the fluorescence detector 18 is found by a following formula.

$$Tm=2000\ [\mu L]/(1000\ [\mu L/min]+1000\ [\mu L/min])=1.0\ [min]$$

The sample arrives at the junction A at a point in time that is earlier than the start point in time of the appearance period TP of the peak PK by the moving time Tm, and passes through the junction A at a point in time that is earlier than the end point in time of the appearance period TP of the peak PK by the moving time Tm. Therefore, the second pump 12 is controlled such that the fluorescent reaction liquid is supplied to the junction A in the period from the point in time that is earlier than the start point in time of the appearance period TP of the peak PL by the moving time Tm to the point in time that is earlier than the end point in time of the appearance period TP of the peak PL by the moving time Tm (hereinafter referred to as a junction passing period TSA). In the present example, the junction passing period TSA is from 19.0 min to 21.0 min.

Further, in consideration of variations of a point in time at which the sample arrives at the junction A due to deterioration of the first or second pump 11, 12, a change in outside air temperature or the like, margins ΔT1, ΔT2 are added before and after the junction passing period TSA in the present example. In the present example, the margins ΔT1, ΔT2 are respectively set to 2.0 minutes which is 10% of 20.0 minutes that is a period of time from a point in time at which the sample is introduced to a point in time at which the sample arrives at the junction A. Thus, the supply period TS is set as a period from a point in time that is earlier than a start point in time of the junction passing period TSA by the margin ΔT1 to a point in time that is later than an end point in time of the junction passing period TSA by the margin ΔT2. In the present example, the supply period TS is from 16.0 min to 22.0 min. The margins ΔT1, ΔT2 can be set to any values based on performance of the first or second pump 11, 12, the degree to which the outside air temperature changes, frequency of determination of an analysis condition or the like. In a case where it is not necessary to consider the margins ΔT1, ΔT2, the supply period TS may be set equal to the junction passing period TSA.

The second pump 12 is turned ON at a start point t1 in time of the supply period TS and is turned OFF at an end point t2 in time of the supply period TS. Thus, the fluorescent reaction liquid is supplied to the junction A in the supply period TS that includes the period TSA from the time when the sample arrives at the junction A to the time when the sample passes through the junction A. The supply period TS is shorter than a period of time in which the first pump 11 is turned ON while an analysis is performed once (a period of time in which the mobile phase is supplied to the fluorescence detector 18). In the present example, the fluorescent reaction liquid is supplied to the fluorescence detector 18 only for six minutes out of the total period of time of thirty minutes in which the analysis is performed once.

(4) Analysis Execution Method

Figure 4:
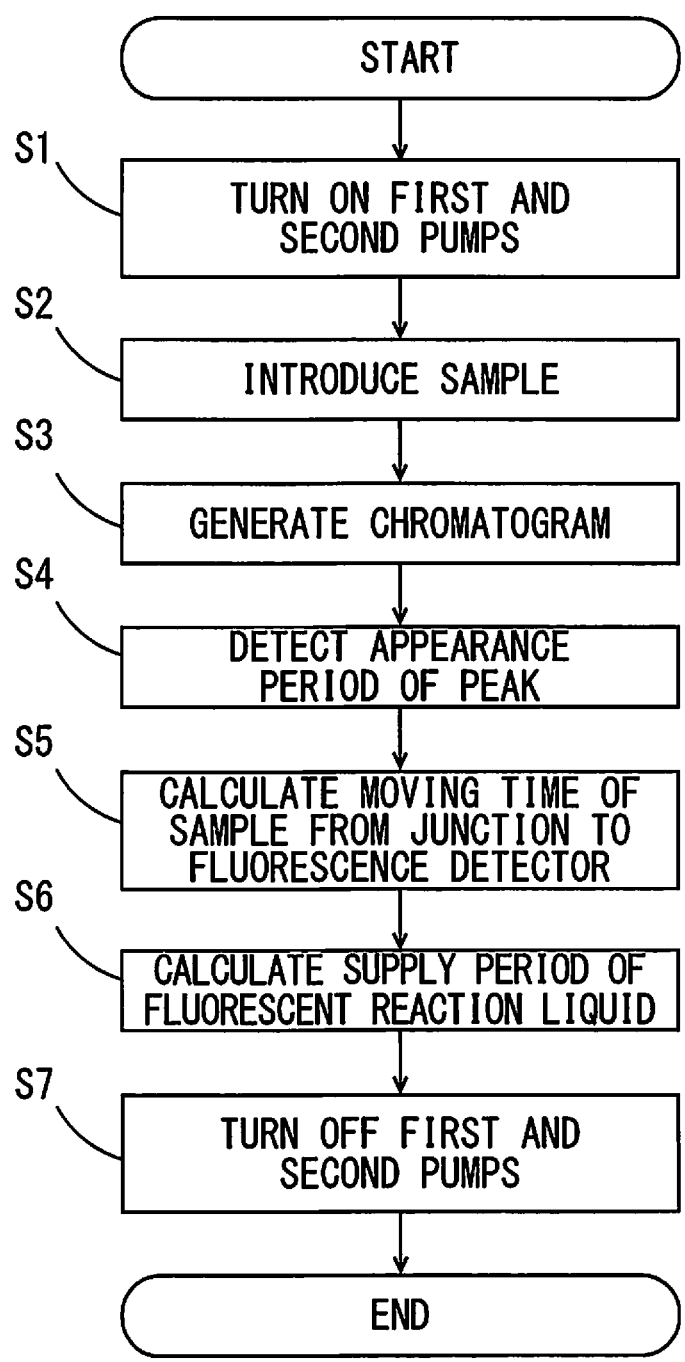
FIG. 4 is a flowchart showing a method of determining an analysis condition in an analysis execution method according to the present embodiment.

FIG. 4 is a flowchart showing the method of determining an analysis condition in the analysis execution method according to the present embodiment. The method of determining an analysis condition of FIG. 4 is performed by execution of the analysis control program.

A discharge flow rate of the first pump 11 and a discharge flow rate of the second pump 12 are defined in advance in the analysis method. First, the behavior switcher 305 switches the behavior of the second liquid sending controller 302 to determination of an analysis condition based on an operation performed by the user using the operation unit 36. During determination of an analysis condition, the first liquid sending controller 301 and the second liquid sending controller 302 turn ON the first and second pumps 11, 12 via the chromatograph controller 19 (step S1). Thus, a mobile phase is supplied by the first pump 11 from the mobile phase container 110 to the junction A through the analysis column 16 at a set flow rate, and a fluorescent reaction liquid is supplied by the second pump 12 from the fluorescent reaction liquid container 120 to the junction A at a set flow rate. Then, the sample introduction controller 304 causes the sample introducer 13 to introduce a sample to the introduction port 14 via the chromatograph controller 19 (step S2).

The chromatogram generator 303 starts generating a chromatogram based on an output signal of the fluorescence detector 18 (step S3). The mobile phase, the sample and the fluorescent reaction liquid are supplied from the junction A to the fluorescence detector 18. At this time, a specific component in the sample is changed to a fluorescent derivative by the fluorescent reaction liquid. The generated chromatogram is displayed in the display 37.

The peak period detector 306 detects an appearance period TP of a peak PK corresponding to the specific component in the sample based on the chromatogram generated by the chromatogram generator 303 (step S4). The moving time calculator 307 calculates a moving time Tm in which the sample moves from the junction A to the fluorescence detector 18 based on a total flow rate of the mobile phase, the sample and the fluorescent reaction liquid supplied from the junction A to the fluorescence detector 18 and a volume of a flow path from the junction A to the fluorescence detector 18 (step S5). In this case, the moving time calculator 307 stores the volume of the flow path that extends from the junction A to the fluorescence detector 18 and includes the reaction coil 17 in advance.

The supply period calculator 308 calculates a supply period TS based on the appearance period TP of the peak PK, the moving time Tm in which the sample moves from the junction A to the fluorescence detector 18 (step S6). In this manner, the supply period TS is automatically determined by the supply period determiner 310. The supply period storage 309 stores the supply period TS calculated by the supply period calculator 308.

Thereafter, the first and second liquid sending controllers 301, 302 turn OFF the first and second pumps 11, 12 via the chromatograph controller 19 (step S7). Thus, the supply of the mobile phase and the supply of the fluorescent reaction liquid to the junction A ends, and either the mobile phase or the fluorescent reaction liquid is not supplied to the fluorescence detector 18.

The user may execute the process of the steps S4 to S6 and determine the supply period TS. In this case, the user can calculate the supply period TS using the method shown in FIG. 3 based on the peak PK in the chromatogram generated by the chromatogram generator 303. The user causes the supply period storage 309 to store the calculated supply period TS by using the operation unit 36.

Figure 5:
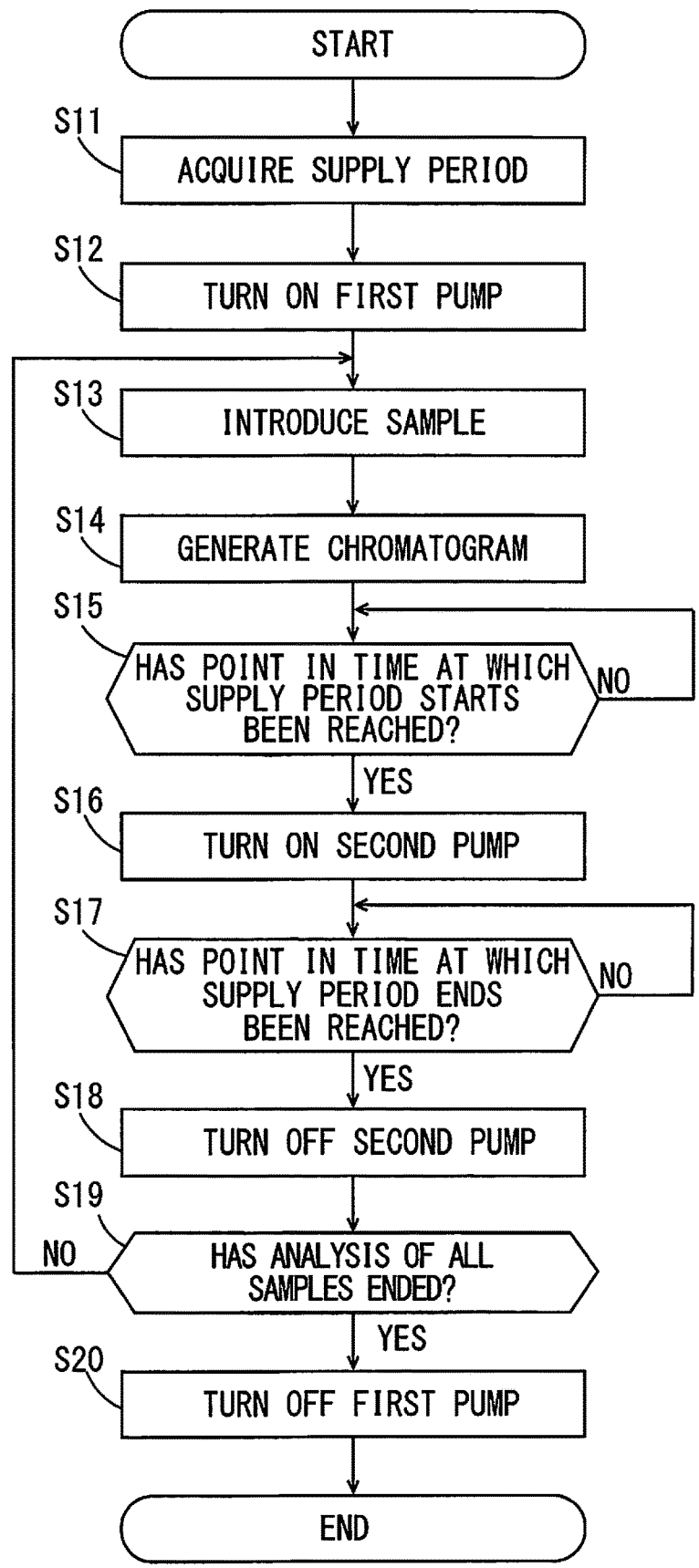
FIG. 5 is a flowchart showing a method of analyzing a sample in the analysis execution method according to the present embodiment.

FIG. 5 is a flowchart showing the method of analyzing a sample in the analysis execution method according to the present embodiment. The method of analyzing a sample of FIG. 4 is performed by execution of the analysis control program.

First, the behavior switcher 305 switches the behavior of the second liquid sending controller 302 to an analysis of a sample based on an operation performed by the user using the operation unit 36. During an analysis of a sample, the second liquid sending controller 302 acquires a supply period TS stored in the supply period storage 309 (step S11). The first liquid sending controller 301 turns ON the first pump 11 via the chromatograph controller 19 (step S12). Thus, a mobile phase is supplied by the first pump 11 to the fluorescence detector 18 at a set flow rate from the mobile phase container 110 through the analysis column 16 and the junction A. Next, the sample introduction controller 304 causes the sample introducer 13 to introduce a sample to the introduction port 14 via the chromatograph controller 19 (step S13). The second liquid sending controller 302 measures an elapsed period of time from a point in time at which the sample is introduced to the introduction port 14.

The chromatogram generator 303 starts generating a chromatogram based on an output signal of the fluorescence detector 18 (step S14). The generated chromatogram is displayed in the display 37.

The second liquid sending controller 302 determines whether a start point t1 in time of the supply period TS has been reached (step S15). In a case where the start point t1 in time of the supply period TS has not been reached, the second liquid sending controller 302 waits until the start point t1 in time of the supply period TS is reached. In a case where the start point t1 in time of the supply period TS is reached, the second liquid sending controller 302 turns ON the second pump 12 via the chromatograph controller 19 (step S16). Thus, a fluorescent reaction liquid is supplied by the second pump 12 from the fluorescent reaction liquid container 120 to the junction A at a set flow rate.

The sample that is introduced in the step S13 arrives at the junction A later than a point in time at which the fluorescent reaction liquid is supplied to the junction A. Thus, the mobile phase, the sample and the fluorescent reaction liquid are supplied to the fluorescence detector 18 through the reaction coil 17. At this time, a specific component in the sample is changed to a fluorescent derivative by the fluorescent reaction liquid.

The second liquid sending controller 302 determines whether an end point t2 in time of the supply period TS has been reached (step S17). In a case where the end point t2 in time of the supply period TS has not been reached, the second liquid sending controller 302 waits until the end point t2 in time of the supply period TS is reached. In a case where the end point t2 in time of the supply period TS is reached, the second liquid sending controller 302 turns ON the second pump 12 via the chromatograph controller 19 (step S18). Thus, the supply of the fluorescent reaction liquid by the second pump 12 to the junction A ends. Therefore, the fluorescent reaction liquid is not supplied to the fluorescence detector 18.

The behavior switcher 305 determines whether all samples have been analyzed (step S19). In a case where all samples have not been analyzed, the sample introduction controller 304 returns to the step S13. Thus, the steps S13 to S19 are performed in regard to a next sample. In a case where all samples have been analyzed, the first liquid sending controller 301 turns ON the second pump 12 via the chromatograph controller 19 (step S20).

Determination of an analysis condition in FIG. 4 may be carried out for an analysis that is performed once in regard to one sample or may be carried out for an analysis that is to be performed multiple times in regard to one lot or a plurality of lots of samples.

(5) Effects of Embodiments

In the liquid chromatographic system 100 according to the present embodiment, a fluorescent reaction liquid is supplied to the junction A in the supply period TS that is determined during determination of an analysis condition. The supply period TS is a short period of time that includes the period TSA from a point in time at which a sample arrives at the junction A to a point in time at which the sample passes through the junction A. Therefore, a period of time in which a fluorescent reaction liquid is supplied to the fluorescence detector 18 is shorter than a total period of time in which an analysis is performed once. As a result, frequency of maintenance or replacement of optical components of the fluorescence detector 18 can be reduced.

Further, in the present embodiment, during an analysis of a sample, the start and stop of supply of a fluorescent reaction liquid by the second pump 12 is controlled based on a supply period TS that is determined during determination of an analysis condition. In this case, the determined supply period TS can be used in an analysis that is to be performed any number of times.

Further, during determination of an analysis condition, in a case where the supply period determiner 310 of FIG. 2 is used, the supply period in which a fluorescent reaction liquid is supplied is automatically determined. This alleviates user's work.

(6) Other Embodiments

While the analysis control device 30 is provided separately from the chromatograph controller 19 in the liquid chromatograph 10 in the above-mentioned embodiment, the chromatograph controller 19 may have part or all of the functions of the analysis control device 30.

(7) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the first pump 11 is an example of a first liquid sender, the second pump 12 is an example of a second liquid sender, the chromatogram generator 303 is an example of a generator, the moving time calculator 307 is an example of a time calculator and the supply period calculator 308 is an example of a period calculator. As each of various elements recited in the claims, various other elements having configurations or functions described in the claims can be also used.

The invention claimed is:

1. An analysis control device that controls a liquid chromatograph including a first liquid sender, a second liquid sender, a sample introducer, an analysis column, a junction and a fluorescence detector, comprising:

a first liquid sending controller that controls the first liquid sender such that a mobile phase is supplied to the fluorescence detector through the analysis column and the junction during an analysis of a sample and during determination of an analysis condition;

a second liquid sending controller that controls the second liquid sender such that a fluorescent reaction liquid is supplied to the fluorescence detector through the junction during the analysis of the sample and during the determination of the analysis condition;

a sample introduction controller that controls the sample introducer such that the sample is introduced into the mobile phase by the sample introducer at a position farther upstream than the analysis column during the analysis of the sample and during the determination of the analysis condition;

a generator that generates a chromatogram based on an output signal of the fluorescence detector during the analysis of the sample and during the determination of the analysis condition; and a supply period determiner that determines a period from a point in time at which the second liquid sender starts supplying the fluorescent reaction liquid to a point in time at which the second liquid sender ends supplying the fluorescent reaction liquid as a supply period based on the chromatogram generated by the generator during the determination of the analysis condition, wherein the supply period determiner determines a start point in time of the supply period such that the fluorescent reaction liquid arrives at the junction later than a point in time at which supply of the mobile phase starts and before the sample introduced into the mobile phase arrives at the junction, and also determines a point in time after the sample passes through the junction as an end point in time of the supply period, and the second liquid sending controller causes the second liquid sender to start supplying the fluorescent reaction liquid at the start point in time of the determined supply period and causes the second liquid sender to stop supplying the fluorescent reaction liquid at the end point in time of the supply period during the analysis of the sample.

2. A liquid chromatographic system comprising:
a liquid chromatograph that includes a first liquid sender, a second liquid sender, a sample introducer, an analysis column, a junction and a fluorescence detector; and
the analysis control device according to claim 1 that controls the liquid chromatograph.

3. An analysis control device that that controls a liquid chromatograph including a first liquid sender, a second liquid sender, a sample introducer, an analysis column, a junction and a fluorescence detector, comprising a first liquid sending controller that controls the first liquid sender such that a mobile phase is supplied to the fluorescence detector through the analysis column and the unction during an analysis of a sample;

a second liquid sending controller that controls the second liquid sender such that a fluorescent reaction liquid is supplied to the fluorescence detector through the junction during the analysis of the sample;

a sample introduction controller that controls the sample introducer such that the sample is introduced into the mobile phase by the sample introducer at a position farther upstream than the analysis column during the analysis of the sample;

a generator that generates a chromatogram based on an output signal of the fluorescence detector during the analysis of the sample; and a supply period determiner that determines a period from a point in time at which the second liquid sender starts supplying the fluorescent reaction liquid to a point in time at which the second liquid sender ends supplying the fluorescent reaction liquid as a supply period during determination of an analysis condition, wherein the second liquid sending controller causes the second liquid sender to start supplying the fluorescent reaction liquid such that the fluorescent reaction liquid arrives at the junction later than a point in time at which supply of the mobile phase starts and before the sample introduced into the mobile phase arrives at the junction, and causes the second liquid sender to stop supplying the fluorescent reaction liquid after the sample passes through the junction, the second liquid sending controller causes the second liquid sender to start supplying the fluorescent reaction liquid at the start point in time of the determined supply period and causes the second liquid sender to stop supplying the fluorescent reaction liquid at the end point in time of the supply period during the analysis of the sample, the first and second liquid sending controllers control the first liquid sender such that the mobile phase is supplied to the fluorescence detector through the analysis column and the junction, and controls the first and second liquid senders such that the fluorescence reaction liquid is supplied to the fluorescence detector through the junction, during the determination of the analysis condition, the sample introduction controller controls the sample introducer such that the sample is introduced into the mobile phase by the sample introducer at a position farther upstream than the analysis column during the determination of the analysis condition, and the supply period determiner includes:

a peak period detector that detects a period in which a peak of a component in the sample appears with respect to a point in time at which the sample is introduced into the mobile phase as a peak appearance period based on the chromatogram generated by the generator during the determination of the analysis condition, a time calculator that calculates a moving time in which the sample moves from the junction to the fluorescence detector based on a total flow rate of the mobile phase, the sample and the fluorescent reaction liquid that are supplied from the junction to the fluorescence detector and a volume of a flow path from the junction to the fluorescence detector during the determination of the analysis condition, and a period calculator that calculates a period including a period starting earlier than the peak appearance period detected by the peak period detector the moving time calculated by the time calculator as the supply period during the determination of the analysis condition.

4. An analysis execution method performed by a liquid chromatograph that includes an analysis column, a junction and a fluorescence detector, including:
  supplying a mobile phase to the fluorescence detector through the analysis column and the junction during determination of an analysis condition;
  supplying a fluorescent reaction liquid to the fluorescence detector through the junction during the determination of the analysis condition;
  introducing a sample into the mobile phase at a position farther upstream than the analysis column during the determination of the analysis condition;
  generating a chromatogram based on an output signal of the fluorescence detector during the determination of the analysis condition;
  determining a period from a point in time at which supply of the fluorescent reaction liquid starts to a point in time at which the supply of the fluorescent reaction liquid ends as a supply period based on the generated chromatogram by a supply period determiner during the determination of the analysis condition;
  supplying the mobile phase to the fluorescence detector through the analysis column and the junction during an analysis of a sample;
  supplying the fluorescent reaction liquid to the fluorescence detector through the junction in the supply period determined by the supply period determiner during the analysis of the sample;
  introducing the sample into the mobile phase at a position farther upstream than the analysis column during the analysis of the sample; and
  generating the chromatogram based on the output signal of the fluorescence detector during the analysis of the sample, wherein
  the determining by the supply period determiner includes determining a start point in time of the supply period such that the fluorescent reaction liquid arrives at the junction later than a point in time at which supply of the mobile phase starts and before the sample introduced into the mobile phase arrives at the junction, and determining a point in time after the sample passes through the junction as an end point in time of the supply period, and
  the supplying the fluorescent reaction liquid to the fluorescence detector includes starting supply of the fluorescent reaction liquid at the start point in time of the determined supply period and stopping the supply of the fluorescent reaction liquid at the end point in time of the supply period during the analysis of the sample.

5. An analysis execution method performed by a liquid chromatograph that includes an analysis column, a junction and a fluorescence detector, including:
  supplying a mobile phase to the fluorescence detector through the analysis column and the junction during an analysis of a sample;
  suppling a fluorescent reaction liquid to the fluorescence detector through the junction during the analysis of the sample;
  introducing the sample into the mobile phase at a position farther upstream than the analysis column during the analysis of the sample;
  generating a chromatogram based on an output signal of the fluorescence detector during the analysis of the sample; and
  determining a period from a point in time at which supply of the fluorescent reaction liquid starts to a point in time at which the supply of the fluorescent reaction liquid ends as a supply period during determination of an analysis condition,
  wherein the supplying the fluorescent reaction liquid to the fluorescence detector through the junction includes starting supply of the fluorescent reaction liquid such that the fluorescent reaction liquid arrives at the junction later than a point in time at which supply of the mobile phase starts and before the sample introduced into the mobile phase arrives at the junction, and stopping the supply of the fluorescent reaction liquid after the sample passes through the junction,
  the supplying the fluorescent reaction liquid to the fluorescence detector includes starting supply of the fluorescent reaction liquid at the start point in time of the determined supply period and stopping the su ply of the fluorescent reaction liquid at the end point in time of the supply period during the analysis of the sample, and
  the determining the supply period includes:
  detecting a period in which a peak of a component in the sample appears with respect to a point in time at which the sample is introduced into the mobile phase based on the generated chromatogram as a peak appearance period during the determination of the analysis condition;
  calculating a moving time in which the sample moves from the junction to the fluorescence detector based on a total flow rate of the mobile phase, the sample and the fluorescent reaction liquid that are supplied from the junction to the fluorescence detector and a volume of a flow path from the junction to the fluorescence detector during the determination of the analysis condition; and
  calculating a period including a period starting earlier than the detected peak appearance period by the calculated moving time as the supply period during the determination of the analysis condition.

* * * * *